United States Patent Office 2,774,738
Patented Dec. 18, 1956

2,774,738

CALCIUM CADMIUM PHOSPHATE PHOSPHOR

Keith H. Butler, Marblehead, Mass., assignor to Sylvania Electric Products Inc., Salem, Mass., a corporation of Massachusetts No Drawing. Application April 10, 1951,
Serial No. 220,357

1 Claim. (Cl. 252—301.6)

This invention relates to phosphors for excitation by ultraviolet radiation, cathode rays, X-rays and the like, and in particular to phosphors for fluorescent lamps.

Such lamps usually require a phosphor which can be excited by ultraviolet radiation of short wavelength, such as the 2537 Angstrom unit mercury radiation.

Luminescent phosphates for such excitation have been described in my copending application Serial No. 149,643, filed March 14, 1950, now Patent No. 2,619,471 issued November 25, 1952, in which the phosphor is activated by the combination of tin and manganese. If the tin used in that phosphor is replaced by lead, the resultant material is found to be substantially non-fluorescent under 2537 Angstrom unit irradiation. I have found that the lead-activated material can be made to respond to such excitation if part of the calcium in the phosphor is replaced by cadmium.

The gram-atom ratio of calcium to cadmium must, however, be kept within a limited range and I have discovered that all materials having compositions within that range have substantially identical crystal structures. This crystal structure was previously unknown and produces an X-ray powder diffraction pattern different from that of tri-calcium orthophosphate and from that of calcium-cadmium phosphates of compositions outside my useful range.

The formula for these new fluorescent powders can be expressed in the form $M_x(PO_4)_2$ where M represents the sum Ca+Cd. The value of $x$ in this formula is very important and must be appreciably below the stoichiometric value of 3.00 if fluorescent materials are to be obtained. Since the left hand part of the formula includes manganese, the range of useful ratios of calcium to cadmium in the phosphor depends to some extent on the amount of manganese present, and can best be expressed indirectly, in terms of the mol ratios of the various metals to the phosphate radical. I have found that the mol ratio of calcium-plus-cadmium to the phosphate radical should lie between the limits of about 2.95/2.00 to about 2.50/2.00.

If the sum of calcium-plus-cadmium exceeds 2.95 gram-atoms per 2.00 gram-moles of the phosphate radical, the powders are substantially non-fluorescent and are often discolored gray. If the sum falls below 2.50, the fluorescence falls off somewhat rapidly and the X-ray powder diffraction pattern changes.

In addition to the limitation on the gram-atom or mole ratio of (Ca+Cd)PO4 there are also limits on the ratios (Ca+Mn)/PO4 and Mn/PO4 and the composition must be kept within such limits if good phosphors having the desired crystal structure are to be obtained. The three limits are:

| Ratio | Maximum | Minimum |
|---|---|---|
| (Ca+Cd)/PO4 | 2.95/2.00 | 2.50/2.00 |
| (Ca+Mn)/PO4 | 2.10/2.00 | 1.30/2.00 |
| Mn/PO4 | .15/2.00 | 0.01/2.00 |

The amount of lead required for activation is not critical and is rather small. Due to the volatility of lead at high temperatures, a considerable portion of the amount in the original mixture is lost in firing. The magnitude of this loss will depend on such variables as firing temperature, firing time, container size, and container shape. I have found that satisfactory phosphors can be made with lead contents between 0.01 and 0.10 gram-atom of lead for each two gram mols of the phosphate radical when the powders are fired between 1900 and 2100° F. in 100 cc. crucibles.

The phosphor resulting from a composition within the ranges specified above, can be excited by 2537 A. radiation from a mercury arc and will fluoresce a deep red. The color of the fluorescence is not substantially affected by variation in composition within the range specified. It may be described as a broad emission band extending from 520 to 720 millimicrons with a peak at about 630 millimicrons. If the cadmium content falls below the minimum amount specified, the fluorescence falls off very rapidly and the powders often exhibit a pink discoloration. The X-ray powder diffraction pattern becomes that of the low-temperatures or $\beta$ form of tricalcium orthophosphate. If the cadmium content rises above the maximum amount specified, the fluorescence falls off rather slowly, becoming zero when tri-cadmium phosphate is formed. Several new X-ray patterns appear, as evidence of a change in crystal structure.

The phosphor of the present invention gives the following X-ray powder diffraction pattern:

| Relative Intensity | Interplanar Spacing (K) Units) |
|---|---|
| S | 7.19 |
| W+ | 6.17 |
| W | 5.11 |
| W | 4.28 |
| W+ | 3.94 |
| VW | 3.78 |
| W+ (diffuse band) | 3.635 |
| VW | 3.304 |
| VW | 3.184 |
| VVW | 3.080 |
| VW | 2.961 |
| S | 2.893 |
| M | 2.859 |
| W− | 2.750 |
| M | 2.589 |
| W+ | 2.548 |
| W− | 2.450 |
| W− | 2.349 |
| VVW | 2.289 |
| VW | 2.208 |
| W+ (very diffuse) | 2.143 |
| W− | 2.063 |
| W− | 2.010 |
| VVW | 1.969 |
| W+ | 1.912 |
| VW | 1.834 |
| W− | 1.799 |
| VW | 1.770 |
| W− | 1.749 |
| VVW | 1.677 |
| W− | 1.650 |
| W− | 1.604 |
| W | 1.565 |
| W+ (very diffuse) | 1.537 |

In preparing these phosphors, it is best to use secondary calcium phosphate, secondary cadmium phosphate and cadmium carbonate as sources of calcium, cadmium, and phosphate. While these are the preferred materials, various substitutions are possible. For example, tri-calcium phosphate and tri-cadmium phosphate may be combined with ammonium phosphate or calcium carbonate and cadmium carbonate may be used with ammonium phosphate. Manganese can be added as manganese carbonate, manganese oxide, manganese phosphate or even as a halide. Lead may be added as a halide, as lead oxide or lead carbonate.

The necessary amounts of the selected raw materials are mixed by ballmilling, either dry or in a suspending medium, or can be dry-mixed and hammermilled. After this blending operation the mixture is fired at a suitable temperature, which generally lies between 1900° and 2100° F., though good fluorescent materials have been made at temperatures outside this range. The firing may be carried out in air or in a neutral atmosphere such as nitrogen or argon using any inert heat-resisting material as container. Silica or porcelain crucibles or trays are very satisfactory. After firing, the powder is crushed or hammermilled and is then ready for use.

As one example of my invention, I will describe the preparation of a phosphor containing the following amounts of the various ingredients expressed in gram-atoms or gram moles:

| Material: | Gram atoms or moles |
|---|---|
| $PO_4$ | 2.00 |
| Ca | 1.70 |
| Cd | 1.117 |
| Mn | .10 |
| Pb | .01 |

For this composition, the ratios are calculated as being:

| Material: | Gram atoms or moles |
|---|---|
| $Mn/PO_4$ | 0.10/2.00 |
| $(Ca+Mn)/PO_4$ | 1.80/2.00 |
| $(Ca+Cd)PO_4$ | 2.82/2.00 |

In preparing the phosphor, the following amounts of reagent grade chemicals in the form of fine powders, were mixed by ballmilling in acetone, after which the blend was filtered, dried, and lightly crushed:

| Material | Moles | Grams |
|---|---|---|
| $CaHPO_4$ | 1.70 | 231.0 |
| $CdNH_4PO_4$ | 0.20 | 45.0 |
| $CdCO_3$ | 0.975 | 16.8 |
| $MnHPO_4$ | 0.10 | 15.1 |
| $PbCO_3$ | 0.01 | 2.67 |

The blend was fired in an open silica crucible for 2 hours at 1950° F., giving a slightly sintered powder which exhibited a deep red fluorescence when excited by 2537 A. radiation from a mercury arc.

The table below shows the relative output of light, measured by a photo-voltaic cell through a red filter, in terms of an arbitrary standard rated at 100, for a number of compositions made in substantially the same manner as described in the example above. The 2537 Angstrom Unit mercury line was the exciting radiation.

| Gram Atoms or Moles | | | | | Relative Output |
|---|---|---|---|---|---|
| Ca | Cd | Mn | $PO_4$ | Pb | |
| 2.85 | ---- | .10 | 2.00 | .025 | 0 |
| 2.50 | .35 | .10 | 2.00 | .025 | 0 |
| 2.30 | .55 | .10 | 2.00 | .025 | 0 |
| 2.10 | .75 | .10 | 2.00 | .025 | 19 |
| 2.00 | .85 | .10 | 2.00 | .025 | 49 |
| 2.00 | .95 | .10 | 2.00 | .02 | 49 |
| 2.00 | .80 | .10 | 2.00 | .02 | 44 |
| 2.00 | .72 | .10 | 2.00 | .02 | 45 |
| 2.00 | .60 | .10 | 2.00 | .02 | 13 |
| 2.00 | .40 | .10 | 2.00 | .02 | 0 |
| 1.70 | 1.17 | .10 | 2.00 | .01 | 41 |
| 1.50 | 1.37 | .10 | 2.00 | .01 | 30 |
| 1.10 | 1.77 | .10 | 2.00 | .01 | 16 |
| .70 | 2.17 | .10 | 2.00 | .01 | 12 |
| .30 | 2.57 | .10 | 2.00 | .01 | 0 |

The table shows clearly that tri-calcium phosphate is non-fluorescent when activated by lead and manganese without the presence of cadmium, and that the relative fluorescent output falls to zero when the mol ratio to the phosphate radical of either the manganese, the manganese-plus-calcium, or the calcium-plus-cadmium falls outside the ranges given in this application.

In the following claims, the ratio of gram atoms of the metals to gram-moles of the phosphate radical is called the "mol ratio" for convenience.

What I claim is:

A calcium cadmium phosphate phosphor activated by about 0.1 mol of manganese and between about 0.01 and 0.025 mole of lead, for each two moles of the phosphate radical, and having between 0.6 and 2.17 moles of cadmium per each two moles of phosphate radical, with the mole ratio of calcium plus cadmium to the phosphate radical between about 2.95/2.00 and 2.60/2.00.

References Cited in the file of this patent
UNITED STATES PATENTS

| 2,434,764 | Froelich | Jan. 20, 1948 |
| 2,471,082 | Schulman | May 24, 1949 |